Figure 1:
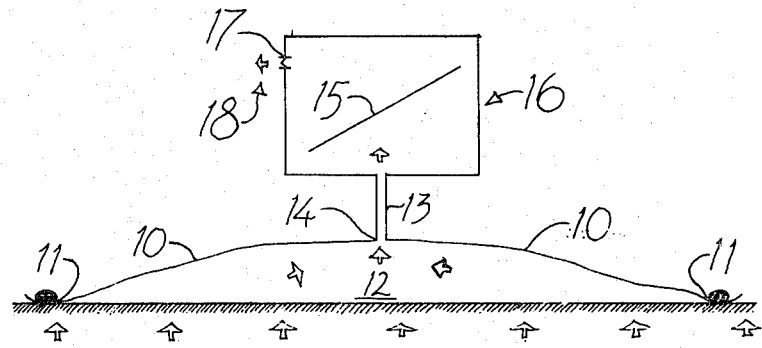

United States Patent [19]

Malmqvist et al.

[11] Patent Number: 4,468,558
[45] Date of Patent: Aug. 28, 1984

[54] METHOD AND APPARATUS FOR MEASURING RADON BENEATH AND ABOVE THE LEVEL OF THE GROUND

[75] Inventors: Erik L. Malmqvist, Skelleftea; Krister Kristiansson, Lund, both of Sweden

[73] Assignee: Boliden Aktiebolag, Stockholm, Sweden

[21] Appl. No.: 306,720

[22] Filed: Sep. 29, 1981

[30] Foreign Application Priority Data

Oct. 20, 1980 [SE] Sweden ............................... 8007338

[51] Int. Cl.³ .............................................. G01V 5/00
[52] U.S. Cl. ..................................... 250/253; 250/255
[58] Field of Search ............... 250/253, 254, 255, 256, 250/472.1, 473.1, 474.1

[56] References Cited

U.S. PATENT DOCUMENTS 3,862,576  1/1975  Pogorski .
3,968,371  7/1976  Greendale .
4,017,731  4/1977  Howell et al. ...................... 250/253
4,129,776  12/1978  Fleischer ............................. 250/253
4,186,303  1/1980  Smith et al. ......................... 250/253
4,352,014  9/1982  Powell ................................. 250/253

Primary Examiner—Janice A. Howell
Attorney, Agent, or Firm—Stevens, Davis, Miller & Mosher

[57] ABSTRACT

The invention relates to a method and apparatus for measuring at least one of the parameters flow rate, flow velocity, concentration and quantity of radon and/or radon daughters in the ground. The method is characterized by collecting gas arriving from the ground in a first chamber which is gas-permeable at the bottom thereof, at least the downwardly extending boundaries of the chamber being in contact with the ground, so that atmospheric gas is prevented from passing into the chamber. At least one detector which measures alpha-radiation from the decomposition of radon and radon daughters is placed in a second chamber communicating with the first chamber. Positioning of the second chamber and the detector is selected so that the detector can continuously be observed and utilized for the measuring operation. The gas is allowed to pass continuously through the chambers over a given period of time, to expose the detector to the gas. Subsequent to this exposure, the measuring result registered on the detector is evaluated. The method can be modified for measuring radon departure from the surface of the ground, the gas-permeable first chamber being arranged over the surface of the ground to be analyzed. The detector is placed in a second chamber communicating with the first chamber. For the purpose of measuring the flow rate and velocity of radon passing through the ground there is provided a first chamber beneath the level of the ground, at a desired depth. This first chamber is connected with a gas-impermeable passage to a second chamber which can be readily reached from the level of the ground and which is sealed against penetration of atmospheric air. The detector is placed in the second chamber.

8 Claims, 2 Drawing Figures

METHOD AND APPARATUS FOR MEASURING RADON BENEATH AND ABOVE THE LEVEL OF THE GROUND

The present invention relates to a method for measuring at least one of the parameters flow rate, velocity, concentration and quantity of radon and/or radon daughters in the ground or emanating from the ground.

Radon-222 is a radioactive gas emanating from uranium. It is a member of the radioactive series which begins with uranium-238 and ends with stable lead-206. Radon-220, or thoron, is another form of radon gas produced in the radioactive decay series beginning with thorium-232. Radon-222 has a half-life of 3.82 days, while radon-220 has a half-life of 56 seconds. Both of these gases emit alpha particles as they decay. Radon-222 (hereinafter referred to as "Radon") decays through a chain of daughter products (hereinafter, and in the claims, referred to as "radon-daughters"), which are members of the uranium family. Those radon daughters of immediate interest are polonium-218, $\alpha$-emitter, half-life 3.05 minutes; lead-214, $\beta$-emitter, half-life 26.8 minutes; bismuth-214,$\beta(\alpha)$-emitter, half-life 19.7 minutes; and polonium-214, $\alpha$-emitter, half-life 164 microseconds. Both radon-222 and radon-220 may be present in gas found in pores in the ground, and both can be produced locally at the surface of the ground by disintegration of its parent nuclei present in the ground. In the case of radon-220, local production is the only productive mechanism possible, because of the short half-life of the isotope. Although radon-222 may also be produced locally, measurements have shown that part of the radon-222 present in the air located in the ground, hereinafter also referred to as ground gas, may have been produced at locations remote from the place where the measurements were taken, perhaps some hundreds of meters therefrom.

It has previously been proposed to determine the amount of radon in the ground, for the purpose of localising uranium-containing bodies of ore beneath the surface of the ground.

One method for detecting the presence of radon immediately below the level of the ground is found described in Swedish patent publication No. 336680. When practising this known method, however, it is said that only relatively shallow ore deposits can be detected, and then only if the ground above the deposit is sufficiently porous to provide for a gas-diffusion rate which is so high that measurable quantities of radon are still present at the measuring location, despite the radon-222 half-life of 3.82 days.

Thus, the expedient of measuring radon in the ground, close to the surface thereof, is known when prospecting for uranium ores located close to the surface. The fact that there exists a transport system for radon through propagation of gas present in the ground, and that the elements of the uranium series are present in varying quantities, even in other ores and geological formations, radon measurements taken in the ground, close to the surface thereof, provides a possibility of obtaining new geophysical knowledge about deeper lying formations; knowledge which may be of importance, inter alia, both when prospecting for uranium and for other metallic raw materials.

High concentrations of radon-222 in ground-air, by which is meant air located beneath the surface of the ground, may also result in high concentrations of radon and radon daughters in buildings located on that particular site at which the measurements were taken, and also indicate the presence of a health risk. Consequently, when planning the erection of a building in a particular building site, it is desirable to measure the radon content of the ground air, so that steps can be taken to prevent the occurence of unacceptably high levels of radon and radon daughters in the finished building.

One disadvantage associated with the aforementioned known methods of detecting the presence of radon, is that they are highly impracticable. As disclosed in more detail in, for example, Swedish patent publication No. 336688, Swedish published patent application No. 7709101-5, and Swedish published patent application No. 7709102-3, radon concentrations are at present measured down to a depth of less than 0.5 m with the aid of electronic detectors, or naked cellulose-nitrate films arranged in inversed cup-like bodies, over periods of about one month. Subsequent to exposing the nitrate films, the bodies carrying the films must be dug out of the ground, in order to determine the amount of radon present at the measuring location. This limits the practicle use of such bodies to depths of less than one meter. The usefulness of the electronic detectors is also seriously impaired by their sensitivity to rough handling and external disturbances. Tests and research carried out by us in conjunction with the advent of the present invention have indicated that the dependence of radon concentration on depth beneath the ground is such as to make it desirable to know the radon concentration even at greater depths, if it is to be possible to evaluate the risks involving radon when building on radon-contaminated ground. Tests have also indicated that there exists a slow flow of gas through the ground. This flowing ground-gas is mainly comprised of nitrogen, although minor quantities of oxygen, noble gases and carbon dioxide may also be present. The flow of gas moves upwardly and is slow and irregular, and varies with time and between closely adjacent locations in the ground. As far as we were able to ascertain, this slowly flowing ground-gas is, in the majority of places, the main vehicle for transporting radon through the ground. This flow of radon-contaminated ground-gas is one possible explanation as to how radon is able to move through distances far greater than those which would be possible if diffusion through the ground was the major or sole radon-transport mechanism.

Measurement of the radon content and the speed at which the ground-gas moves through ground layers causes problems, among other reasons because both the speed of flow and the radon content of the gas are particularly low. Further, the detector material suffers disturbances from alpha-particles emanating from thoron gas ($^{220}$Rn), particularly when measuring radon concentrations in uranium-prospecting operations. Since thoron gas is formed from the basic element thorium, the total alpha-radiation registered will constitute a measurement of the sum of the uranium and thoron content of the underlying earth layer or layers. Thus, in order to be able to measure the amount of uranium present in the ground at the measuring site, it is necessary to eliminate the alpha-radiation from thoron gas. As taught by Swedish published Patent application Nos. 7709101-5, and 7709102-3, it has been proposed, to this end, to force the ground gas to pass through a permselective membrane which allows gases to pass therethrough, and which delays said passage before the gases can reach the alpha-particle detector. Because thoron, $^{220}$Rn, has a half-life of 56 seconds and radon, $^{222}$Rn, has a half-life of 3.82 days, the thoron content of the gas will have decreased subsequent to the passage of said gas through the membrane. This is also true of the radon content, however.

It has now surprisingly been found possible to eliminate the aforementioned disadvantages and limitations encountered when detecting radon and, in accordance with the present invention, to measure the amount of radon present in the ground at greater depths and over wider areas than was previously found possible, without being necessary to remove from the ground the detectors on which the aforementioned film is exposed, in order to evaluate the results. It also has been found possible, in accordance with one aspect of the invention, to prospect uranium and other ore deposits by collecting ground-gas at the depth desired beneath the surface of the ground, and by passing the collected gas to ground level or to some other accessible location, for example a mine shaft, so that alpha-particles can be registered by means of detectors and the radon concentration and the flow of radon gas can be measured as desired.

By utilizing given embodiments of the present invention for measuring the radon content and the flow of radon gas in the ground-gas, it is possible at the same time to eliminate almost completely the background disturbances created by thoron gas ($^{220}$Rn). In accordance with the invention, the measurements can be made over a practically unlimited period of time and, in certain cases, at any selected depth beneath the surface of the ground, wherewith gas flow, flow velocity and concentration can be continuously observed and determined in a very reliable manner.

The characteristic features of the present invention are set forth in the following claims.

The invention will now be described in more detail with reference to the accompany drawing, in which FIG. 1 illustrates schematically one embodiment of the invention, namely an apparatus for collecting ground-gas at a location above the surface of the ground and registering the amount of radon present in the gas.

Figure 2:
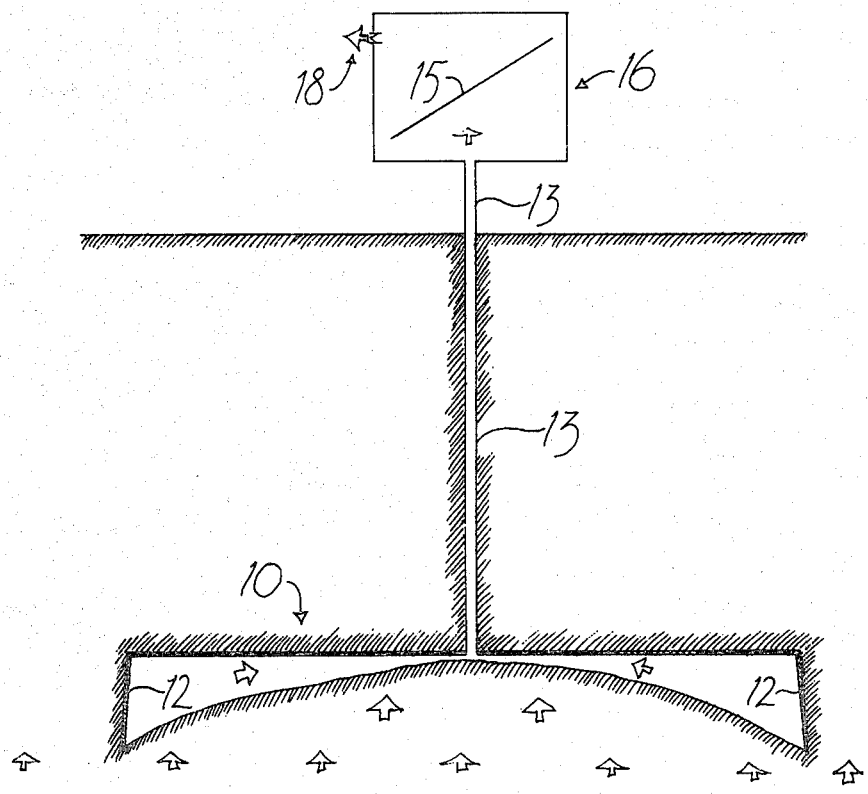

FIG. 2 illustrates a further embodiment of the invention, namely an apparatus for measuring the flow of radon and its flow velocity beneath the surface of the ground.

The apparatus illustrated in FIG. 1 is of particular interest when planning the erection of a building on a particular piece of ground, where the ground-gas has a high radon content and where it is desirable to measure the amount of radon leaving the ground. Measurements concerning the departure of radon both from ground which is untouched and from ground which has been prepared for the erection of buildings are of interest. The occurrence of wide local variations in radon transportation and radon discharge makes it necessary to either carry out a large number of measurements at different locations on the ground in question, or to use a detector system which registers the departure of radon as a mean value for the whole of the area of ground studied. The embodiment of the invention hereinafter described with reference to FIG. 1 constitutes a detector system which registers the amount of radon departing from the ground over a wide area.

In FIG. 1 there is illustrated a gas impermeable plastics sheet 10 or the like arranged to cover the whole or part of the area from which radon departure is to be measured. The peripheral portions 11 of the plastics sheet 10 are pressed against the surface of the ground and sealed, so that gas cannot freely pass from a space 12 encompassed by the sheet 10 out into ambient atmosphere. The space 12, which hereinafter is referred to as the gas volume, defined by the plastics sheet 10 and the ground surface, communicates with the ambient atmosphere preferably through a hose 13, or optionally solely through a small opening 14 in the sheet 10, so as to prevent even very small differences in pressure between the enclosed volume of gas 12 and the free atmospheric air from occurring, since such pressure differences are able to influence the rate at which the ground-gas flows out from the ground, such flow being indicated in the figure by arrows. Radon detectors are placed in a separate exposure container 16 located externally of the plastics sheet 10, said container communicating with the volume of gas 12 enclosed in the sheet 10 through the hose 13 and being provided with a one-way valve means 17, which permits the gas to flow in only one direction, as shown by the arrow 18. The radon detectors used are trace detectors, which may comprise a naked cellulose nitrate plastics, or cellulose nitrate plastics covered with a plastics layer which protects the detector surface without preventing registration of alpha particles from radon decaying in the mass of air located in front of the detector. The radon detector may also have the form of surface barrier semiconductor detectors or scintillation detectors co-operating with electronic and data collection systems. The detectors are adapted to those particular conditions under which the measurements are taken.

That embodiment of the invention which can be used for measuring purposes beneath the surface of the ground may, of course, in principle be of similar design to the embodiment previously illustrated, although with the exception that the plastics sheet 10 is placed at a desired depth beneath the ground and that the hose 13 extends up through the surface of the ground, to exit in the free atmosphere, where the exposure container 16 is arranged.

The apparatus illustrated in FIG. 2, however, is the preferred embodiment for measuring the flow of radon and the speed of flow through the ground, the illustrated apparatus comprising in principle two containers, connected together by means of a hose. The figure illustrates the apparatus in position for measuring radon in ground air. The lower container, or the ground container, 10 may suitably have the form of a shallow box 12 which lacks a lid and which is placed horizontally, upside down in the ground, at the depth where determination of the radon content is to be made. Ground gas flows freely upwardly into the box 12, as shown by the arrows. The downwardly facing opening of the box 12 suitably has an area of at least 1–2 dm$^2$, so as to enable variations in the gas flow to be equalized to a certain extent. The box 12 has a depth or height of at least 1–2 cm. The flow of gas is passed from the ground container 10, through the hose 13, to the upper container 16, which may be placed on or within the vicinity of the surface of the ground, at least in a manner such as to ensure that it is readily accessible for priming, for example, detector film for both continuous and intermittent investigation of the gas flow. The hose 13 shall have a ratio of length to diameter which is substantially greater than 1, and suitable a length such that when in position for measuring the prevailing gas flow substantially all thoron-gas radiation is able to disappear before said gas passes into the upper container 16. The upper container 16 is not fully closed. Gas flowing through the hose 13 into the container 16 is permitted to continue out into free atmosphere, while said gas is mixed with gas in the container, as shown by the arrow at 18. The pressure-equalizing connection between said container and the free atmosphere should be narrow. The shape and size of the upper container 16 shall be such that alpha-particles from radon daughters adhering to the walls of the container are not detected.

Arranged in the upper container 16 is a detector 15 which measures alpha radiation from the decay of radon and radon daughters present in the gas in the container 16. The radon concentration in the upper container 16 is dependent upon the concentration of radon in the ground air, the flow rate of the ground air and the dimensions of the apparatus. Decay from radon-220 will not be registered, since radon-220 and daughter products decompose before they reach the upper container 16.

The detectors 15 for alpha-radiation from radon and radon daughters in the upper container 16 may be photographic film, photographic nuclear-trace emulsion or naked or covered plastics detectors of cellulose nitrate. In the case of covered plastics detectors, the protective cover may comprise a thin plastics layer of a non-plastics film, the thickness of which is such as to permit alpha-particles from radon and radon daughters from a volume of air located in front of the detector to be registered, but not alpha-particles emanating from radon daughters which have adhered to the protective covering. In this respect a detector such as that described in Swedish published patent application No. 8004273-2 can be used to advantage. The detector for alpha-particles in the upper container 16 may have the form of a semi-conductor detector or a scintillation detector. These two last mentioned detectors are connected to the requisite electronics equipment, which incorporates a data-collecting system.

We claim:

1. A method for measuring at least one of the parameters flow rate, velocity, concentration and quantity of radon and/or radon daughters in the ground, comprising collecting gas emanating from the ground in a first chamber which is permeable to gas only at the bottom thereof, at least the downwardly extending boundaries of said first chamber being in contact with the ground, so that atmospheric air is prevented from passing into said first chamber; placing at least one detector capable of measuring alpha-radiation from the decomposition of radon and radon daughters in a second chamber communicating with said first chamber, the second chamber being located easily accessible so that the detector can be readily observed and utilized for said measuring operation; and causing the gas to pass continuously through the first and second chambers and exiting from the second chamber over a given period of time, in order to expose the gas to said detector; measuring the gas exposed to the detector and evaluating the measured result subsequent to said exposure.

2. A method according to claim 1 in which the departure of radon from the surface of the ground is measured, comprising arranging the first chamber over the surface of the ground to be analysed, so as to permit passage of gas flowing from the ground to pass through said first chamber, and continuously ensuring that the internal pressure of at least one of said chambers is substantially equal to the outer atmospheric pressure during the exposure period.

3. A method according to claim 1 in which radon flow rate and its velocity in the ground are measured, comprising arranging the downwardly gas-permeable first chamber beneath the level of the ground at a desired depth; and by connecting the first chamber by means of a gas-impermeable passage, to the second chamber in which second chamber the detector is placed and which is accessible from the level of the ground, said second chamber being sealed against the penetration of atmospheric air.

4. A method according to claim 1 wherein ssaid first chamber is comprised of a gas-impermeable plastics film whose peripheral parts are pressed firmly against the ground.

5. A method according to claim 1 wherein said first chamber is comprised of a gas-impermeable film whose peripheral parts of said film are buried in said ground.

6. A method according to claim 3 wherein said gas-impermeable passage is a hose.

7. An apparatus for measuring the departure of radon from the ground, comprising a gas-impermeable plastics film covering at least part of the area from which radon departure is to be measured, and arranged in a manner such that atmospheric air is prevented from passing into a first chamber formed between the plastics film and the ground; one or more radon detectors placed in a second chamber communicating with said first chamber via a hose; and a one-way valve arranged in the second chamber, which valve cmprises the only outlet for collected ground gas to pass to the atmosphere.

8. An apparatus for measuring radon flow rate and velocity of radon through the ground, comprising a lower inversed cup-like collecting first chamber for ground gas of gas-impermeable material and placed at a desired depth beneath the surface of the ground; a second exposure chamber to which access can be had from the level of the ground and which is sealed against the ingress of atmospheric air, at least one radon detector placed in said exposure chamber; a hose connecting the two chambers together; and a one-way valve arranged in the exposure chamber, which valve constitutes the only outlet for continuous passage of collected ground gas to pass to the atmosphere.

* * * * *